United States Patent [19]

Taylor

[11] 4,062,583

[45] Dec. 13, 1977

[54] AUTOMOBILE TRUNK ATTACHABLE BRACE

[75] Inventor: Ronald D. Taylor, Norwich, Conn.

[73] Assignee: The Raymond Lee Organization, Inc., New York, N.Y. ; a part interest

[21] Appl. No.: 715,243

[22] Filed: Aug. 18, 1976

[51] Int. Cl.$^2$ .............................................. B62D 65/00

[52] U.S. Cl. .................................... 296/76; 217/60 R

[58] Field of Search ....................... 296/76, 37.5, 37.1, 296/56; 217/60 B, 60 R, 60 E, 60 F, 61

[56] References Cited

U.S. PATENT DOCUMENTS 3,117,689 1/1964 Dedic ................................ 217/60 R

*Primary Examiner*—Philip Goodman

*Attorney, Agent, or Firm*—Howard I. Podell

[57] ABSTRACT

A telescopic support that is mounted to the inside surface of the lid of an automobile trunk and that may be extended to the floor of the trunk to maintain the trunk lid in an open position while carrying oversize objects in the trunk.

2 Claims, 5 Drawing Figures

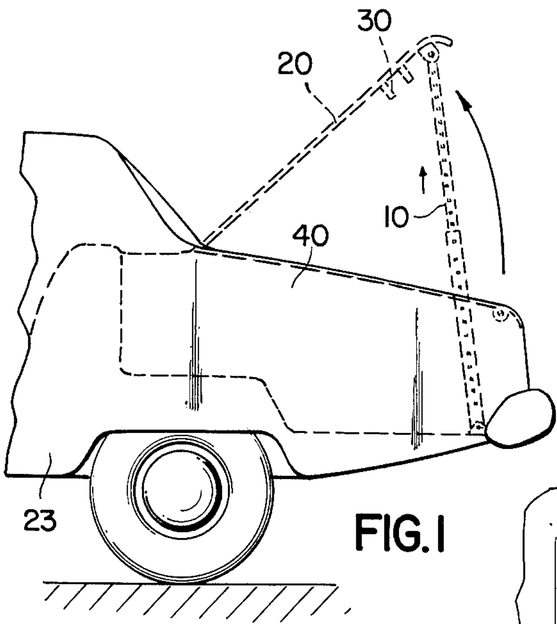
FIG. 1
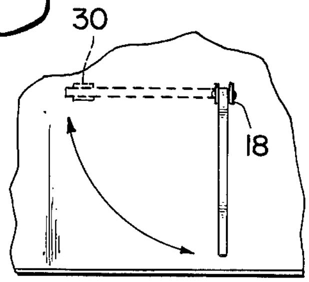
FIG. 5
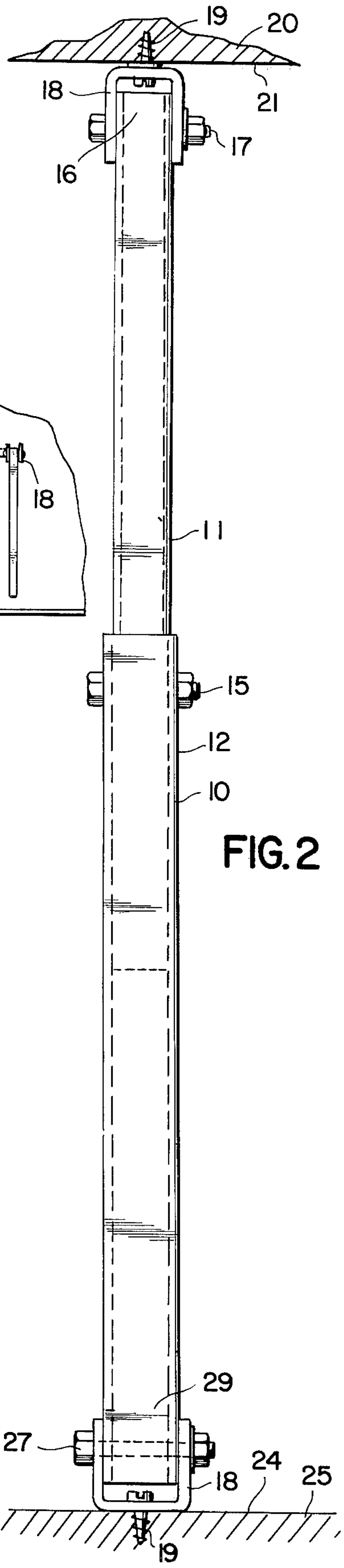
FIG. 2
FIG. 4
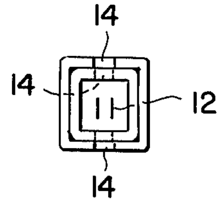
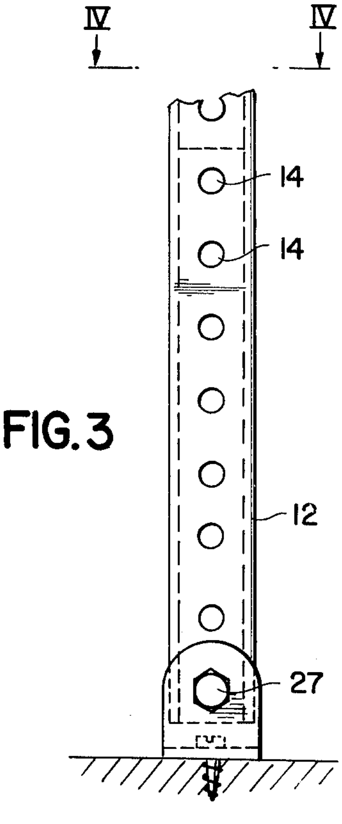
FIG. 3

AUTOMOBILE TRUNK ATTACHABLE BRACE

SUMMARY OF THE INVENTION

My invention is a telescopic support that is mounted to the inside surface of the lid of an automobile trunk and that may be extended to the floor of the trunk to maintain the trunk lid in an open position while carrying oversize objects in the trunk.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a side view of the invention in use;

FIG. 2 is a rear view of the invention;

FIG. 3 is a detail side view of the invention;

FIG. 4 is a sectional view of the invention, taken along line IV—IV of FIG. 3; and FIG. 5 is a plan view of the interior of the installed trunk lid.

DESCRIPTION OF THE PREFERRED EMBODIMENT:

Turning now descriptively to the drawings, in which similar reference characters denote similar elements throughout the several views, FIGS. 1–5 illustrate the telescopic brace unit 10 which is formed of two or more nested tubes 11 and 12 each formed with a plurality of through holes 14 of a size to engage a bolt 15 that extends laterally through a pair of aligned holes 14 in each tube 11 and 12 so as to fix the extended length of the brace unit 10.

Tube 11 is fitted at its upper end 16 by bolt 17 to a U-shape clip 18 pivotably fastened by screw 19 to the underside 21 of trunk lid 20 of vehicle 23. A similar clip 18 is pivotably mounted by a screw 19 to the upper surface 24 of the trunk floor 25 and detachably bolted by bolt 27 to the lower end 29 of tube 12 when the trunk lid is fixed in the open position.

A clip 30 is fastened to the underside 21 of trunk lid 20 at a spaced distance from clip 18 so as to grip lower end 29 of tube 12 when the brace 10 is detached from the trunk floor and stored against the trunk lid, as shown in dash lines in FIG. 5.

Clip 30 may be fitted with bolt holes to permit bolting to leg 12 in the stored position.

Legs 11 and 12 may be extended to any desired length by appropriate location of bolt 15 in holes 14 to maintain lid 20 in the open position for carrying oversize objects in trunk 40 of the vehicle 23.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A telescopic brace mounted to the underside of a hinged vehicle trunk lid enclosing a trunk compartment, together with first fastening means to detachably fasten the brace to the floor of the said vehicle trunk compartment to maintain the trunk lid in the open position, and second fastening means fixed to the underside of the trunk lid to detachably fasten the brace to the underside of the trunk lid so as to store the brace when the lid is closed.

2. The combination as recited in claim 1 in which the brace is pivotally mounted to the underside of the trunk lid so that said brace may be pivoted about in the plane of the trunk lid and in a plane at an angle to the trunk lid so as to travel from a first position in which it is detachably attached to said second fastening means in a plane parallel to the trunk lid, to a second position in which it extends at an angle to the trunk lid to detachably fasten to the first fastening means on the floor of the trunk compartment.

* * * * *